(12) United States Patent
Contractor (10) Patent No.: US 6,608,886 B1
(45) Date of Patent: Aug. 19, 2003

(54) METHOD AND APPARATUS FOR ESTABLISHING A CONNECTION BETWEEN FIRST AND SECOND COMMUNICATION DEVICES

(75) Inventor: Sunil H. Contractor, Marietta, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/995,153

(22) Filed: Nov. 27, 2001

(51) Int. Cl.$^7$ .............................................. H04M 11/04
(52) U.S. Cl. ........................................ 379/45; 379/37
(58) Field of Search ...................... 379/37–51, 127.01, 379/142.01

(56) References Cited

U.S. PATENT DOCUMENTS

| | | | |
|---|---|---|---|
| 6,201,856 B1 * | 3/2001 | Orwick et al. ................. 379/40 |
| 6,295,346 B1 * | 9/2001 | Markowitz et al. ........... 379/45 |
| 6,427,001 B1 | 7/2002 | Contractor et al. ........... 379/45 |
| 6,442,241 B1 * | 8/2002 | Tsumpes ...................... 379/45 |

* cited by examiner

Primary Examiner—Wing Chan
(74) Attorney, Agent, or Firm—Kilpatrick & Lockhart LLP (57) ABSTRACT

A method. The method includes receiving notification that an emergency communication was terminated, and transmitting a message to a second communication device. The message includes a voice prompt for connecting to a first communication device. The method also includes receiving a response to the voice prompt, and completing a connection between the first and second communication devices.

20 Claims, 9 Drawing Sheets

METHOD AND APPARATUS FOR ESTABLISHING A CONNECTION BETWEEN FIRST AND SECOND COMMUNICATION DEVICES

BACKGROUND OF THE INVENTION

1. Field of Invention

The present invention is directed to a method, apparatus, and system related to emergency notification services.

2. Description of the Background

In today's society, there are increasing numbers of people who work at locations other than their homes. In many instances, there are young children who spend considerable amounts of time at home without adult supervision while their parents are working. Such situations can be very stressful to a working parent because of the uncertainty of knowing exactly what the unsupervised children may be doing. There are also a growing number of people who have elderly parents living alone. Understandably, there are many people who, for various reasons, desire to be notified as soon as possible if an emergency call is placed from a location that concerns them, and also wish to be connected to the person who placed the emergency call.

One service that has attempted to address this desire is the family 911 notification service offered by Lucent Technologies Inc., Murray Hill, N.J. Each subscriber to the service may select up to five telephone numbers, each associated with a particular person, that they wish to be called if a 911 call is placed from a landline telephone associated with the subscriber. The selected telephone numbers may be given a priority from first to fifth and may be associated with landline telephones and/or wireless telephones. The service operates in the manner described hereinbelow.

After a 911 call has been placed from a landline telephone associated with a subscriber, the service calls the selected telephone numbers in a sequential order according to the specified priority. If the family 911 notification service reaches a live person at one of the selected telephone numbers, the service plays an announcement. The announcement informs the person that the incoming call is from the family 911 notification service and that a 911 call was placed. The announcement also informs the person as to the time that the 911 call was placed and the telephone number that the 911 call was placed from. If the service reaches a live person after more than five minutes have passed since the 911 call was placed, the live person may be given the option to connect with the landline telephone from which the 911 call was placed. The service stops calling the selected telephone numbers once the information has been provided to a live person. If the service has not reached a live person after all of the selected telephone numbers have been called, the service waits for five minutes before beginning to call the selected telephone numbers again. This process repeats itself for the first hour following the placement of the 911 call. During the first hour, if the service reaches an answering machine or a voice mail system at one of the selected telephone numbers, the service does not play an announcement.

If the service has not reached a live person within the first hour, the service continues to call the selected telephone numbers according to the specified priority. However, if the service reaches an answering machine or a voice mail system after the first hour, the service plays a slightly different announcement. This announcement informs the answering machine or voice mail system that the incoming call is from the family 911 notification service and that the service has been trying to reach the person associated with the selected telephone number to notify them that a 911 call has been placed. This announcement also informs the answering machine or the voice mail system as to the time that the 911 call was placed and the telephone number from which the 911 call was placed. The service stops dialing the selected telephone numbers once an announcement has been played to an answering machine or a voice mail system. If the service has not reached a live person, an answering machine, or a voice mail system within the first twenty-four hours following the placement of the 911 call, the service stops dialing the selected telephone numbers.

There are shortcomings associated with Lucent's family 911 notification service. For example, if the service reaches a live person within the first five minutes following the placement of a 911 call, the live person is not given the option to connect to the landline telephone from which a 911 call was placed. In many situations where time is of the essence, a notified party may wish to be connected to the landline telephone as soon as possible. In addition, when the live person is given the option of connecting to the landline phone, there are no assurances that accepting that option will not interrupt the 911 call itself. Thus, there exists a need for a method, apparatus, and system that overcomes the limitations, shortcomings, and disadvantages of the emergency notification service described hereinabove.

BRIEF SUMMARY OF THE INVENTION

The present invention meets the identified need, as well as other needs, as will be more fully understood following a review of this specification and the accompanying drawings. The present invention relates to a method for establishing a connection between first and second communication devices. The method includes receiving notification that an emergency communication was terminated, transmitting a message to the second communication device, wherein the message includes a voice prompt for connecting to the first communication device, receiving a response to the voice prompt, and completing the connection between first and second communication devices.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention,sa discussion of such elements is not provided herein.

The term"calling party" is used herein generally to refer to the person or unit that initiates a telecommunication. The calling party may also be referred to herein as"caller." The term"called party" is used herein generally to reefer to the person or unit that answers or responds to the call or communication. In some cases the calling party or the called party may not be a person, but may be a device such as an answering machine, a voice mail system, etc. The term "communication" is used herein to include all messages or calls that may be exchanged between a calling party and a called party, including voice, data and video messages. The term "communication" is used synonymously herein with the term"call" unless a distinction is noted. The term"subscriber" is used herein to generally refer to a subscriber of an emergency notification service. The term"notified party" is used herein generally to refer to a person who receives notification that an emergency communication has been placed from a location that is of concern to the person.

According to one embodiment, the present invention utilizes the intelligent functionality of an Advanced Intelligent Network (AIN). The AIN is a network used to provide enhanced voice and data services and dynamic routing capabilities to a conventional telephone network. With AIN, the actual voice call is still transmitted over a circuit-switched network but the signaling and control takes place on a separate packet-switched network. Before describing details of the present invention, a high-level description of an AIN is provided.

Figure 1:
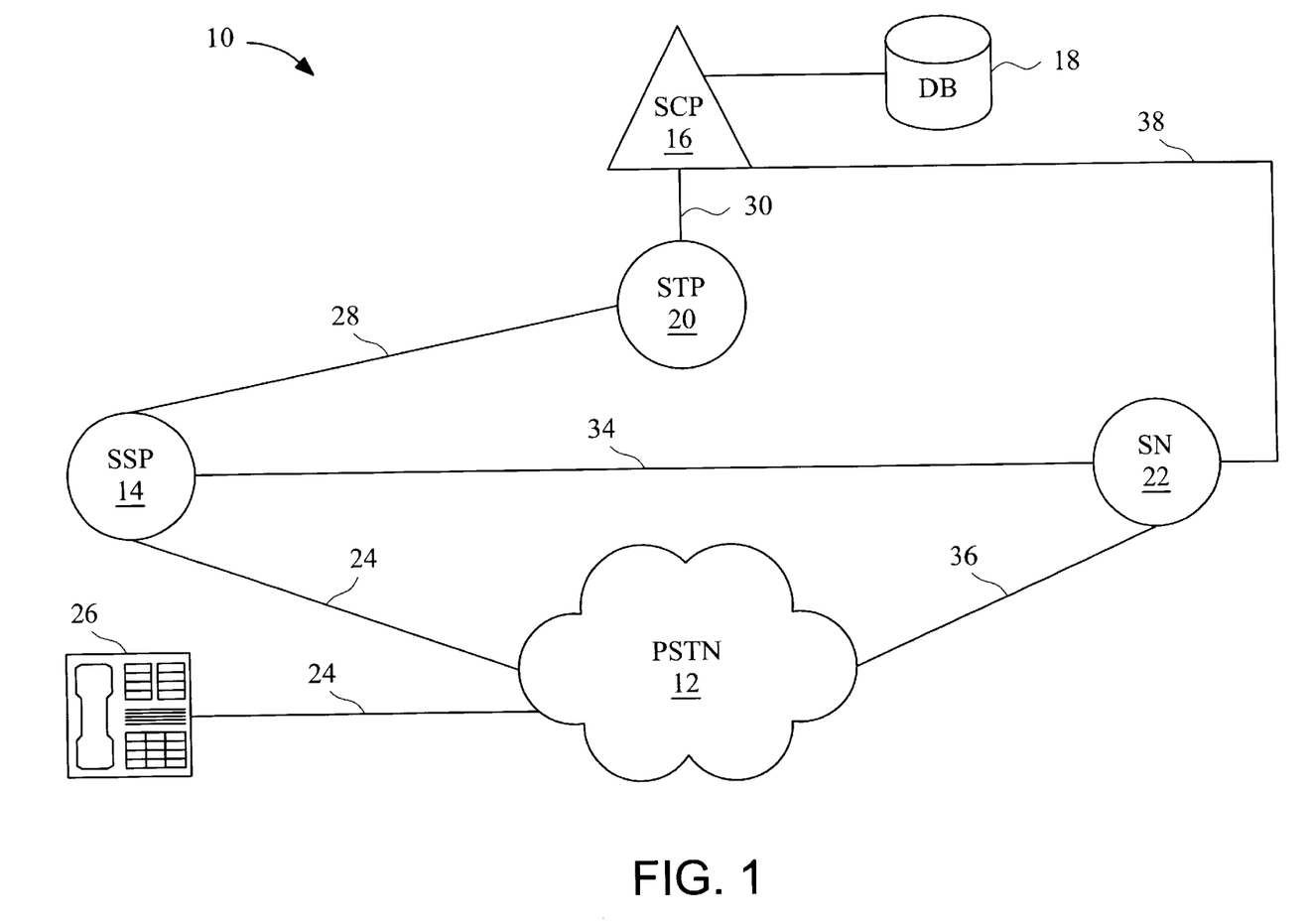
FIG. 1 is a block diagram of an Advanced Intelligent Network (AIN) for integration with a public switched telephone network.

FIG. 1 is a block diagram of an Advanced Intelligent Network (AIN) 10. The AIN 10 may be employed by a Local Exchange Carrier (LEC), and may be utilized by the LEC to allow the LEC to provide call processing features and services that are not embedded within conventional switching circuits of a conventional telephone system such as, for example, the Public Switched Telephone Network (PSTN) 12. As illustrated in FIG. 1, the AIN 10 includes a Service Switching Point (SSP) 14, a Signal Control Point (SCP) 16, a database 18, a Signal Transfer Point (STP) 20, and a Service Node (SN) 22.

In a conventional telephone system, central office (CO) switches are used to interconnect customer premises equipment (i.e., terminal equipment such as telephones, modems, or answering machines that are connected to the telephone network and reside on the customer's premises). For the AIN 10 illustrated in FIG. 1, the SSP 14 is a switch used to interconnect customer premises equipment via the PSTN 12. The difference between the SSP 14 and the CO switch of a conventional telephone system is that the SSP 14 provides intelligent network functionality.

The SSP 14 has one or more subscriber lines 24 connected thereto. The subscriber lines 24 may be, for example, local loops comprising conventional twisted pair loop circuits connected between the SSP 14 and the customer premises, or the subscriber lines 24 may be trunk circuits, such as T-1 trunk circuits. The number of subscriber lines 24 connected to an SSP 14 may be on the order of ten thousand to one hundred thousand lines. The subscriber line 24 is connected to a terminating piece of customer premises equipment, represented in FIG. 1 by a landline telephone 26. Alternatively, the terminating equipment may be any other type of communications unit such as, for example, a telecopier, a personal computer, a modem, an answering machine, or a private branch exchange (PBX) switching system.

The SCP 16 is a server associated with a database 18, and provides instructions to the SSP 14 and the SN 22 as requested and required. The SCP 16 may be an intelligent database server such as, for example, an Intelligent Network Service Control Point available from Lucent Technologies Inc., Murray Hill, N.J. The database 18 is for storing customer information used in providing enhanced calling services, such as the service provided by the emergency notification system of the present invention, and may reside at the SCP 16. The intelligent functionality of the SCP, 16 may be realized by application programs, such as programmable Service Program Applications (SPA), which are executed by the SCP 16. Although the AIN 10 illustrated in FIG. 1 only shows one database 18 associated with the SCP 16, it is understood that more than one database 18 may be associated with the SCP, 16.

The STP 20 is a packet switch that routes signaling and control messages between the SSP 14 and the SCP 16. As illustrated in FIG. 1, the STP 20 is in communication with the SSP 14 via communication link 28 and with the SCP 16 via communication link 30. Communication links 28, 30, may employ, for example, the Signaling System 7 (SS7) signaling protocol.

The SN 22 may provide an enhanced feature or service that requires an audio connection between the SN 22 and customer premises equipment connected to a subscriber line 24. The SN 22 may be any type of AIN compliant service node, and may be, for example, a Compact Services Node (CSN) available from Lucent Technologies Inc., Murray Hill, N.J. Similar to the SCP 16, the intelligent functionality of the SN 22 may be realized by programmable applications executable by the SN 22.

The SN 22 is in communication with the SSP 14 via communication link 34, with the PSTN 12 via communication link 36, and with the SCP 16 via communication link 38. Communication links 34 and 36 may be, for example, an Integrated Service Digital Network (ISDN) Primary Rate Interface (PRI), an ISDN Basic Rate Interface (BRI), or a T-1 trunk circuit. Communication link 38 may be, for example, a portion of a communication network such as, for example, a Local Area Network (LAN), a Metropolitan Area Network (MAN), or a Wide Area Network (WAN).

The basic operation of the AIN 10 illustrated in FIG. 1 is described hereinbelow. When a call originating from the landline telephone 26 is received at the SSP 14 via the PSTN 12, the SSP 14 generates a query to determine how the call should be processed. The query generated by the SSP 14 is transmitted via out-of-band signaling through the STP 20 to the SCP 16.

The SCP 16 interprets the query based on information provided by the SSP 14 and information stored in the database 18 to determine whether some customized call feature or enhanced service should be implemented for the particular call, or whether conventional dial-up telephone service should be provided. The information provided by the SSP 14 may include, for example, the originating telephone number, the name of the calling party, and the telephone number dialed by the calling party. The information stored in the database 18 may include, for example, routing instructions associated with the dialed telephone number. Once the SCP 16 determines how the call is to be processed, it returns a message through the STP 20 to the SSP 14 instructing the SSP 14 how the call should be processed. According to one embodiment of the present invention, the message may include an instruction for the SSP 14 to notify the SCP 16 when the call is terminated. The message may also include instructions for the SSP 14 to take some special action as a result of a customized calling service or enhanced feature. For example, for an enhanced calling feature requiring the capabilities of the SN 22, the return message from the SCP 16 may include instructions for the SSP 14 to route the call to the SN 22. In addition, the return message from the SCP 16 may simply be an indication that there is no entry in the database 18 that indicates anything other than conventional telephone service should be provided for the call. The query and return messages may be formatted, for example, according to conventional SS7 TCAP (Transaction Capabilities Application Part) formats.

Although the AIN 10 illustrated in FIG. 1 includes only one SSP 14, one SCP 16, one database 18, one STP, 20, and one SN 22, it is understood that the AIN 10 may further include an additional number of these components as well as other network components that are not included in FIG. 1 for purposes of clarity. For example, the AIN 10 may additionally include redundant SCP's and STP's to take over if the SCP 16 or the STP 20 should fail. Further, the AIN 10 may include regional STP's and regional SCP's in communication with, for example, the local STP 20, for routing and servicing calls between different LECs.

Figure 2:
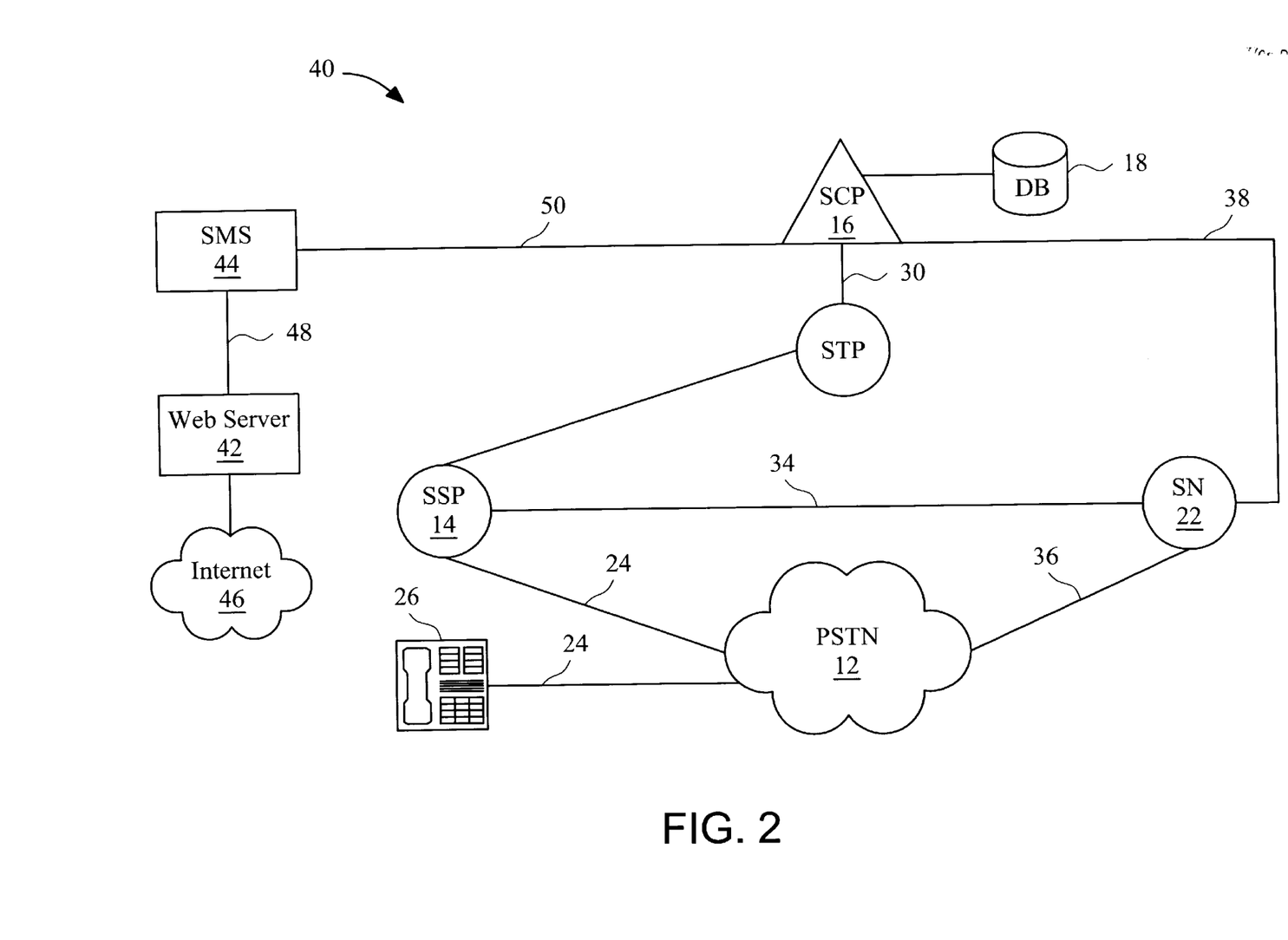
FIG. 2 illustrates an emergency notification system that includes one embodiment of the present invention.

FIG. 2 illustrates an emergency notification system 40 that includes one embodiment of the present invention. The system 40 may be used to establish a connection between a notified party and a communication device from which an emergency communication was placed. The system 40 includes the AIN 10 as described hereinabove with regard to FIG. 1, and also includes a web server 42 and a Service Management System (SMS) 44. The web server 42 is connected to the Internet 46, and is in communication with the SMS 44 via communication link 48. Communication link 48 may be, for example, a portion of the communication network that includes communication link 38.

The SMS 44 is an operations support system used to facilitate the provisioning and administration of service data required by the SCP 16. The SMS 44 includes a network server and a database, and may be used to centralize and manage the service logic and customer data residing at the SCP 16. The SMS 44 includes programmable applications executable by the SMS 44 that provide access to the service management functions of the SMS 44 such as, for example, subscriber provisioning, and provide a direct interface to the SMS database. The SMS 44 is in communication with the SCP 16 via communication link 50. Communication link 50 may be, for example, a portion of the communication network that includes communication link 38.

Figure 3A:
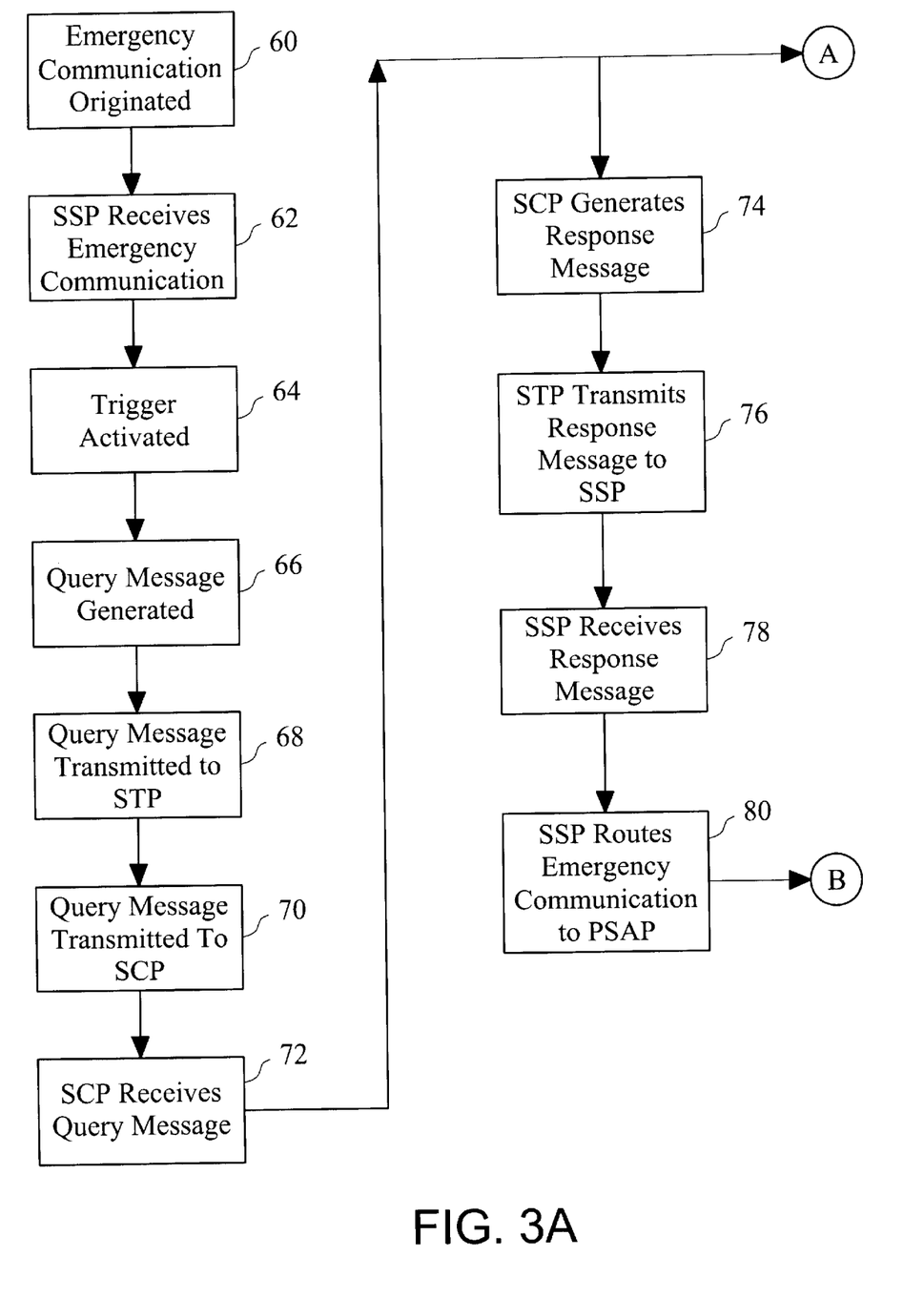
FIGS. 3A and 3B illustrate an embodiment of the process flow of the emergency notification system of FIG. 2.
Figure 3B:
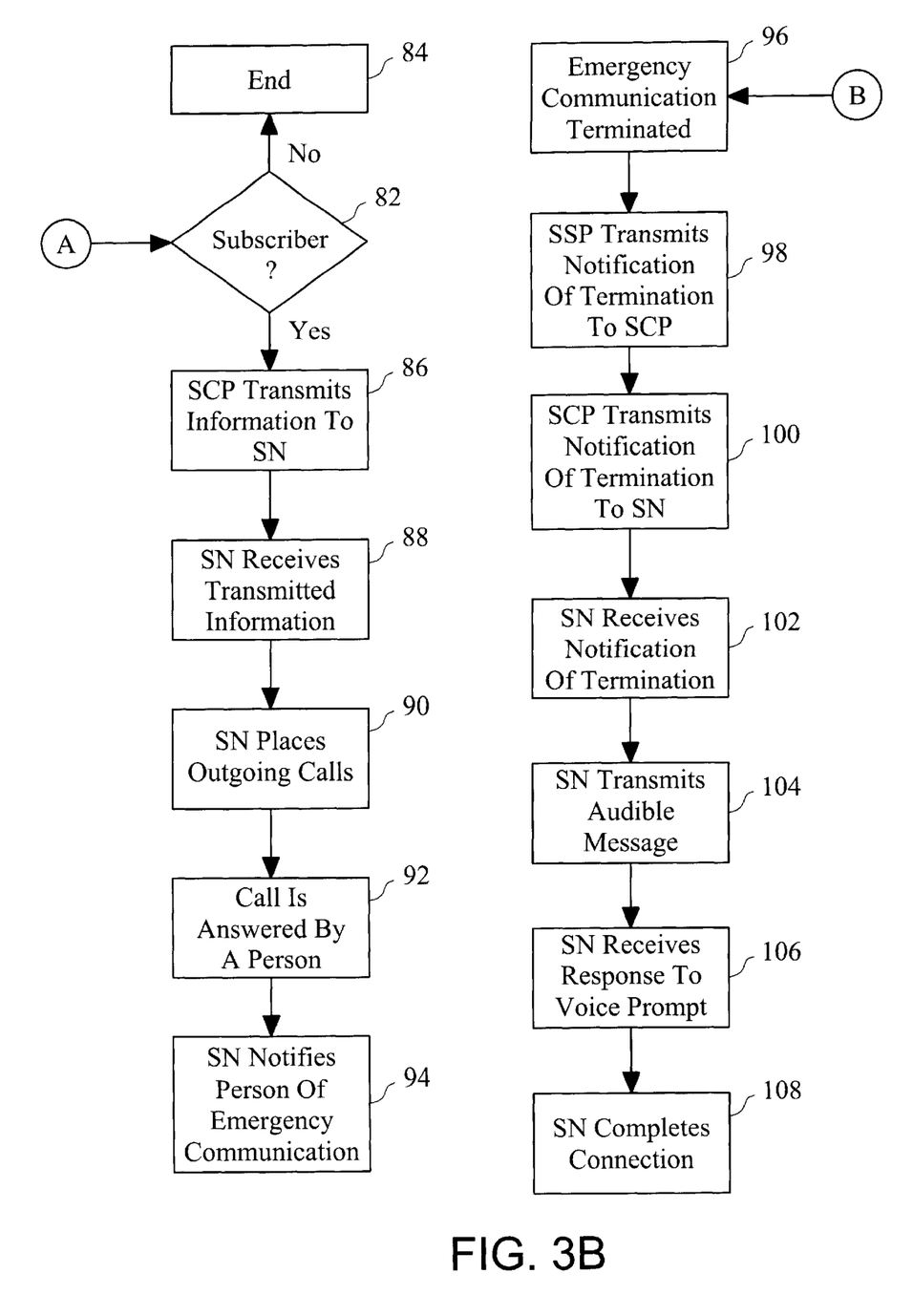

FIGS. 3A and 3B illustrate an embodiment of a process flow of the emergency notification system 40 of FIG. 2. According to this embodiment, when a customer first subscribes to an emergency notification service, subscriber information must be provisioned before the service becomes operational for the subscriber. Subscriber information is provisioned at the SCP 16 and may include the name of the customer, the customer's landline telephone number, and the telephone numbers that the customer wishes to be called when an emergency communication originates from the customer's landline telephone number. The customer may designate any number of telephone numbers that the customer wishes to be called when an emergency communication originates from the customer's landline telephone number. A system administrator may provision the service by entering the information via the SMS 44, which in turn passes the information to the SCP 16, which then populates the database 18 with the information. Alternatively, the subscriber may provision the service remotely via the Internet 46 by providing the information to the web server 42, which in turn passes the information to the SMS 44 for provisioning at the SCP 16 as described hereinbefore.

The process begins at block 60, where an emergency communication is originated from customer premises equipment and transmitted to the SSP 14 via the subscriber line 24 connecting the customer premises equipment to the SSP 14. The emergency communication may be, for example, a 911 call, and the customer premises equipment may be, for example, the customer's landline telephone 26. From block 60, the process proceeds to block 62, where the emergency communication is received at the SSP 14. From block 62, the process proceeds to block 64, where the received emergency communication activates a trigger defined at the SSP 14. A trigger is an event associated with a particular subscriber line 24 that causes the SSP 14 to query the SCP 16 for instructions as to how to process the call. A trigger may be an originating trigger for a call originating from the customer premises or a terminating trigger for a call terminating at the customer premises. From block 64, the process proceeds to block 66, where in response to the activation of the trigger, the SSP 14 generates a, query message. The query message may include a caller ID message giving the customer's telephone number, and the date and time that the 911 call was made. The caller ID message may also include the name of the customer. From block 66, the process proceeds to block 68, where the SSP 14 transmits the query message to the STP 20. From block 68, the process proceeds to block 70, where the STP 20 receives the query message and transmits the query message to the SCP 16. From block 70, the process proceeds to block 72, where the SCP 16 receives the query message generated by the SSP 14.

From block 72, the process proceeds to block 74, where the SCP 16 generates a message in response to the query message and transmits the response message to the STP 20. The response message may instruct the SSP 14 to process the emergency communication as a switch-based feature and to notify the SCP 16 when the emergency communication is terminated. From block 74, the process proceeds to block 76, where the STP 20 receives the response message and transmits it to the SSP 14. From block 76, the process proceeds to block 78, where the SSP 14 receives the response message. From block 78, the process proceeds to block 80, where the SSP 14 interprets the response message and routes the emergency communication to a Public Safety Answering Point (PSAP), where a PSAP operator verifies or obtains the caller's location, determines the nature of the emergency, and decides the appropriate emergency response. For example, the PSAP operator may dispatch help directly, or may transfer the caller to a secondary PSAP from which help will be dispatched. Secondary PSAP's are typically located at fire dispatch areas, municipal police force headquarters, or ambulance dispatch centers.

From block 72, the process also proceeds to block 82, where the SCP 16 uses the information provided by the query message to search the database 18 to determine whether the customer is a subscriber to the emergency notification service. If the customer has not been provisioned as a subscriber to the emergency notification service, the process proceeds from block 82 to block 84, where the process ends. If the customer has been provisioned as a subscriber to the service, the process proceeds from block 82 to block 86, where the SCP 16 transmits information related, to the emergency communication to the SN 22. The information may include the telephone number from which the emergency communication was made, the time and date of the emergency communication, and the designated telephone numbers to be notified for the subscriber. From block 86 the process proceeds to block 88, where the SN 22 receives the transmitted information.

From block 88, the process proceeds to block 90, where the SN 22 begins to place outgoing notification calls to the designated telephone numbers in a sequential manner. From block 90, the process proceeds to block 92, where a person answers the notification call at one of the designated telephone numbers. From block 92, the process proceeds to block 94, where the SN 22 notifies that person of the emergency communication by announcing that the incoming call is from the emergency notification service, that an emergency communication was placed, the telephone number from which the emergency communication was placed, and the time that the emergency communication was placed. Once the announcement has been played to a person who answers at a designated telephone number, the SN 22 may stop placing outgoing notification calls to that particular telephone number. The SN 22 may, however, continue to dial the remaining designated telephone numbers until the announcement has been played to a person who answers the call at those telephone numbers.

While the processes described with respect to blocks 90, 92, and 94 are active, the process may also proceed from block 80 to block 96, where the emergency communication originated at block 60 is terminated. From block 96, the process proceeds to block 98, where the SSP 14 recognizes that the emergency communication has been terminated and transmits notification of the termination to the SCP 16 via the STP 20. The SSP 14 may recognize the termination of the emergency communication by sensing and recognizing a change in a DC signal associated with the subscriber line 24 that carried, the emergency communication. From block 98, the process proceeds to block 100 where the SCP 16 receives the notification transmitted from the SSP 14 and transmits notification of the termination to the SN 22.

From block 100, the process proceeds to block 102, where the SN 22 receives notification that the emergency communication has been terminated. From block 102, the process proceeds to block 104, where the SN 22 transmits an audible message to a communication device associated with a notified party. The message may include a voice prompt for prompting the notified party to connect to the customer premises equipment from which the emergency communication originated. From block 104, the process proceeds to block 106, where the SN 22 receives a response to the voice prompt. According to one embodiment, the response may be in the form of a dual tone multi-frequency signal generated by the notified party pressing a pushbutton on a communication device. According to another embodiment, the response may be in the form of a signal representative of a spoken word or number. From block 106, the process proceeds to block 108, where the SN 22 interprets the response and completes a connection between the customer premises equipment from which the emergency communication originated and the customer premises equipment associated with the notified party. Once the connection is completed, the notified party may speak directly to the person who placed the emergency communication.

Figure 4:
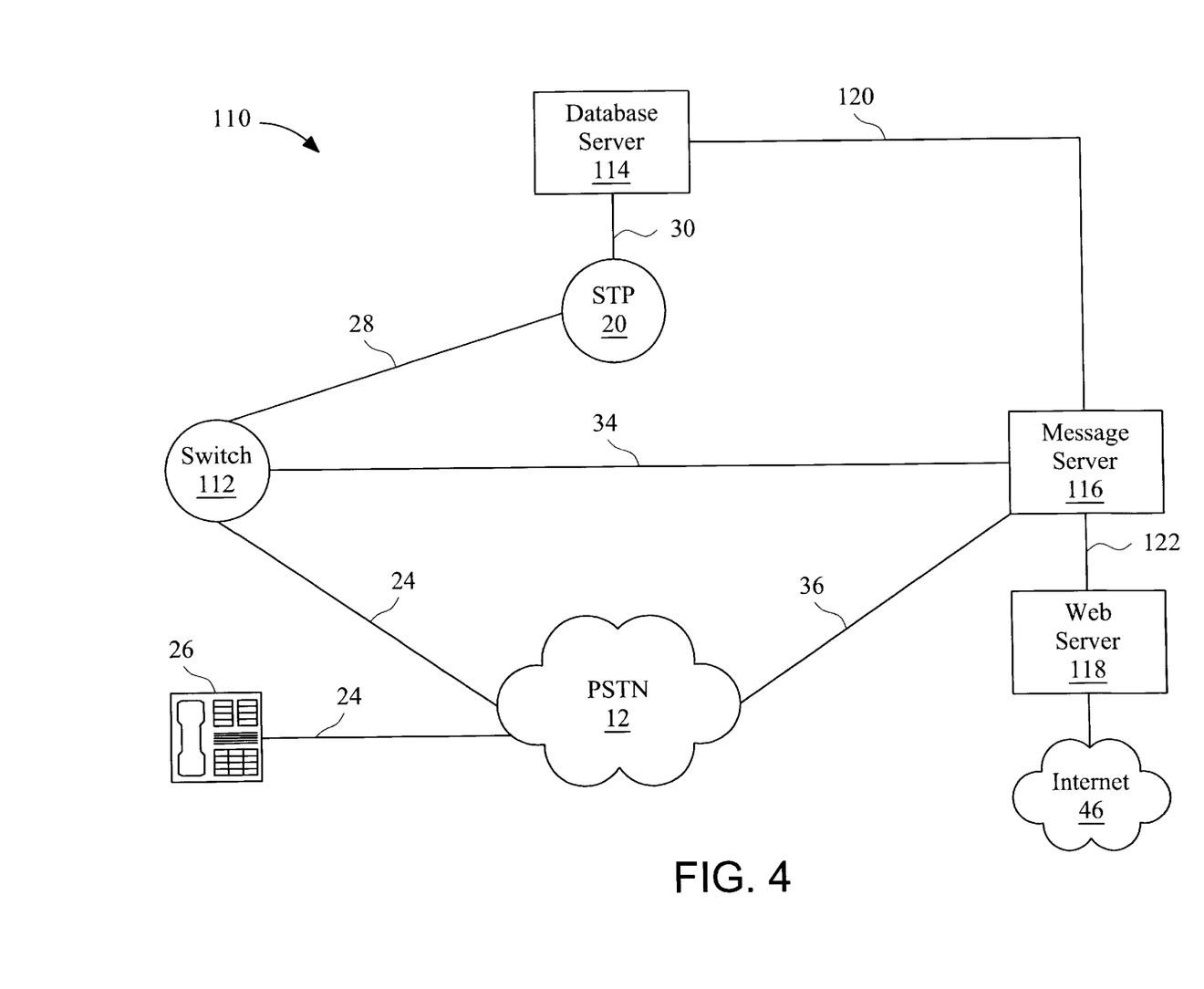
FIG. 4 illustrates an emergency notification system that includes another embodiment of the present invention.

FIG. 4 illustrates a system 110 that incorporates another embodiment of the present invention. The system 110 may be used to establish a connection between a notified party and a communication device from which an emergency communication was placed. The system 110 includes a switch 112, a database'server 114, a message server 116, and a web server 118. The system 110 also includes an STP 20 as described hereinbefore.

The switch 112 may be in communication with terminal equipment such as, for example, a landline telephone 26 associated with the subscriber via a subscriber line such as, for example, subscriber line 24. According to one embodiment, the switch 112 may be a service switching point such as, for example, the SSP 14 as described hereinabove. The switch 112 may include an originating trigger such as, for example, an N11 trigger, and the N11 trigger may be, for example, a 911 trigger. The switch 112 may also be in communication with the STP 20 via communication link 28 and with the message server 116 via communication link 34.

The database server 114 is in communication with the switch 112 via the STP 20 and communication links 28 and 30, and may be a service control point similar to the SCP 16 described hereinbefore. The database server 114 may store call-processing instructions, and may supply instructions to the switch 112 concerning how to process an incoming call. For example, according to one embodiment, the database server 114 may supply the switch with instructions for processing an emergency communication received at the switch 112. The instructions may include, for example, an instruction for the switch 112 to notify the database server 114 when an emergency communication is terminated. By sensing and recognizing a change in a DC signal associated with a subscriber line, the switch 112 may recognize that an emergency communication transmitted via that subscriber line has been terminated. The switch 112 may then transmit a notification message to the database server 114 informing the database server 114 that an emergency communication has been terminated. Although the database server 114 may be similar to the SCP 16, the database server 114 is markedly different from the SCP 16 in that the database server 114 does not maintain the provisioned subscriber information (i.e., subscriber name, subscriber telephone number, telephone numbers to be called, etc.) associated with the emergency notification service. Therefore, the database server 114 may be provided with less storage capacity and require less database maintenance than the SCP 16. Accordingly, the database server 114 may have a lower initial cost than the SCP 16 and have lower maintenance costs associated therewith.

The database server 114 may also supply information associated with an incoming call to the message server 116. For example, the database server 114 may supply the message server 116 with information associated with an emergency communication. Such information may have been provided to the database server 114 by the switch 112 and may include, for example, the name of the person associated with a subscriber line 24 from which the emergency communication originated, the telephone number from which the emergency communication originated, and the date and time that the emergency communication was received at the switch 112.

The message server 116 is in communication with the database server 114 via communication link 120, and may transmit a message after an emergency communication is received at the switch 112. The message server 116 may be any type of low-cost computer suitable for transmitting an oral message and/or a textual message. Whereas the SN 22 employed in system 40 may have an initial cost as high as approximately one-half million dollars, the message server 116 may have an initial cost as low as approximately ten-thousand dollars. According to one embodiment, the message server 116 may be a telephony server that may transmit an oral message. According to another embodiment, the message server 116 may be an electronic mail server that may transmit a textual message. Communication link 120 may be, for example, a portion of a communication network such as, for example, a Local Area Network (LAN), a Metropolitan Area Network (MAN), or a Wide Area Network (WAN). The message server 116 may also be in communication with the PSTN 12 via communication link 36.

The web server 118 is in communication with the message server 116 via communication link 122, and may supply the message server 116 with information associated with a subscriber to an emergency notification service. Communication link 122 may be, for example, a portion of the communication network that includes communication link 120. The web server 118 may be connected to the Internet 46, and the subscriber information may be remotely provisioned and maintained at the web server 118 via the Internet 46. Such subscriber information may include, for example, the subscriber's name, a telephone number associated with the subscriber, designated telephone numbers, and designated electronic mail addresses. Designated telephone numbers may be provisioned to receive a notification in the form of an audible messages and designated electronic mail addresses may be provisioned to receive a notification in the form of a textual message, if an emergency communication is placed from terminal equipment associated with the subscriber. More than five telephone numbers and more than five electronic mail addresses may be provisioned at the web server 118. Provisioning subscriber information directly to the web server 118 reduces the cost and complexity of the emergency notification system.

Figure 5A:
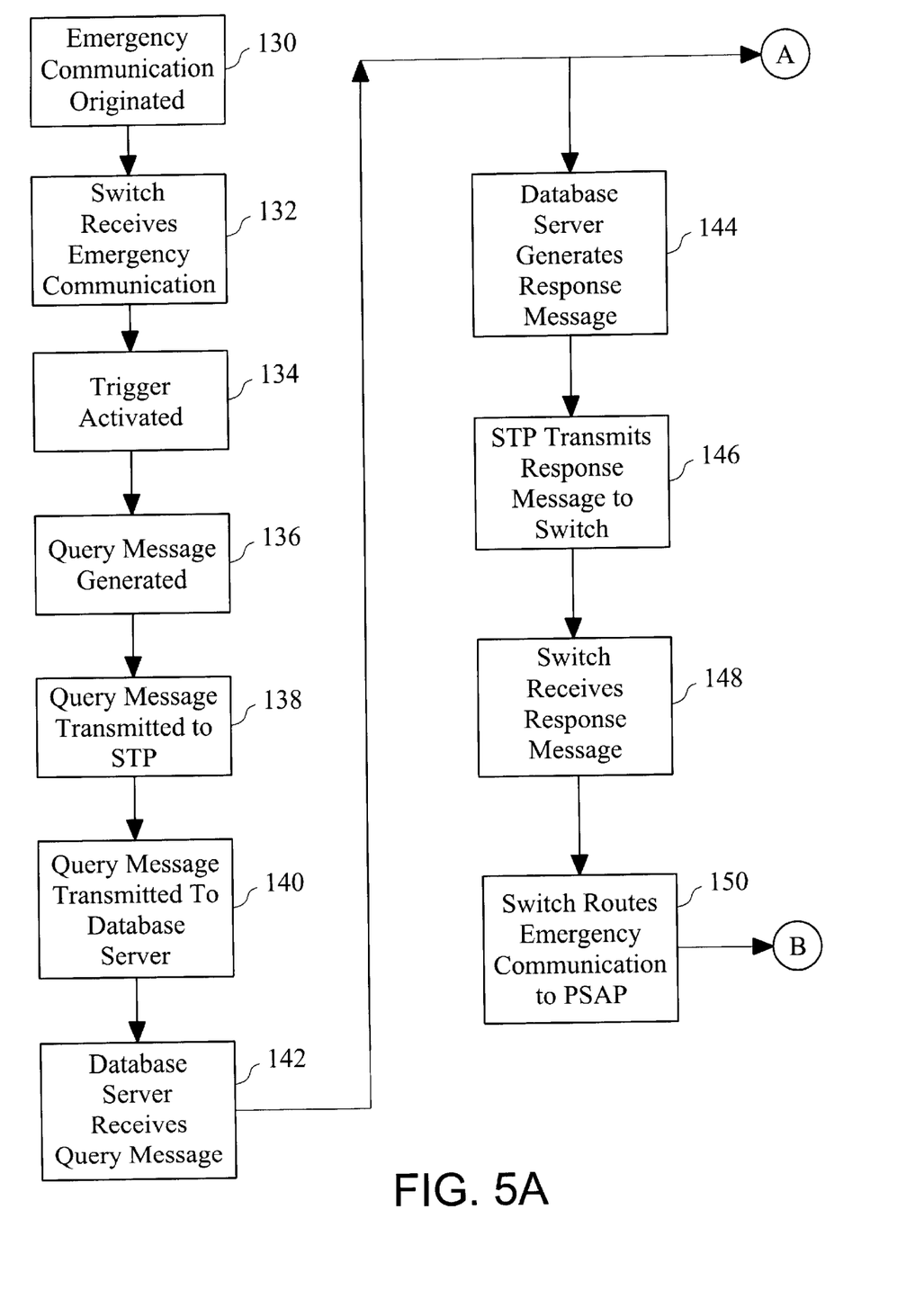
FIGS. 5A, 5B, and 5C illustrate an embodiment of a process flow of the emergency notification system of FIG. 4.
Figure 5B:
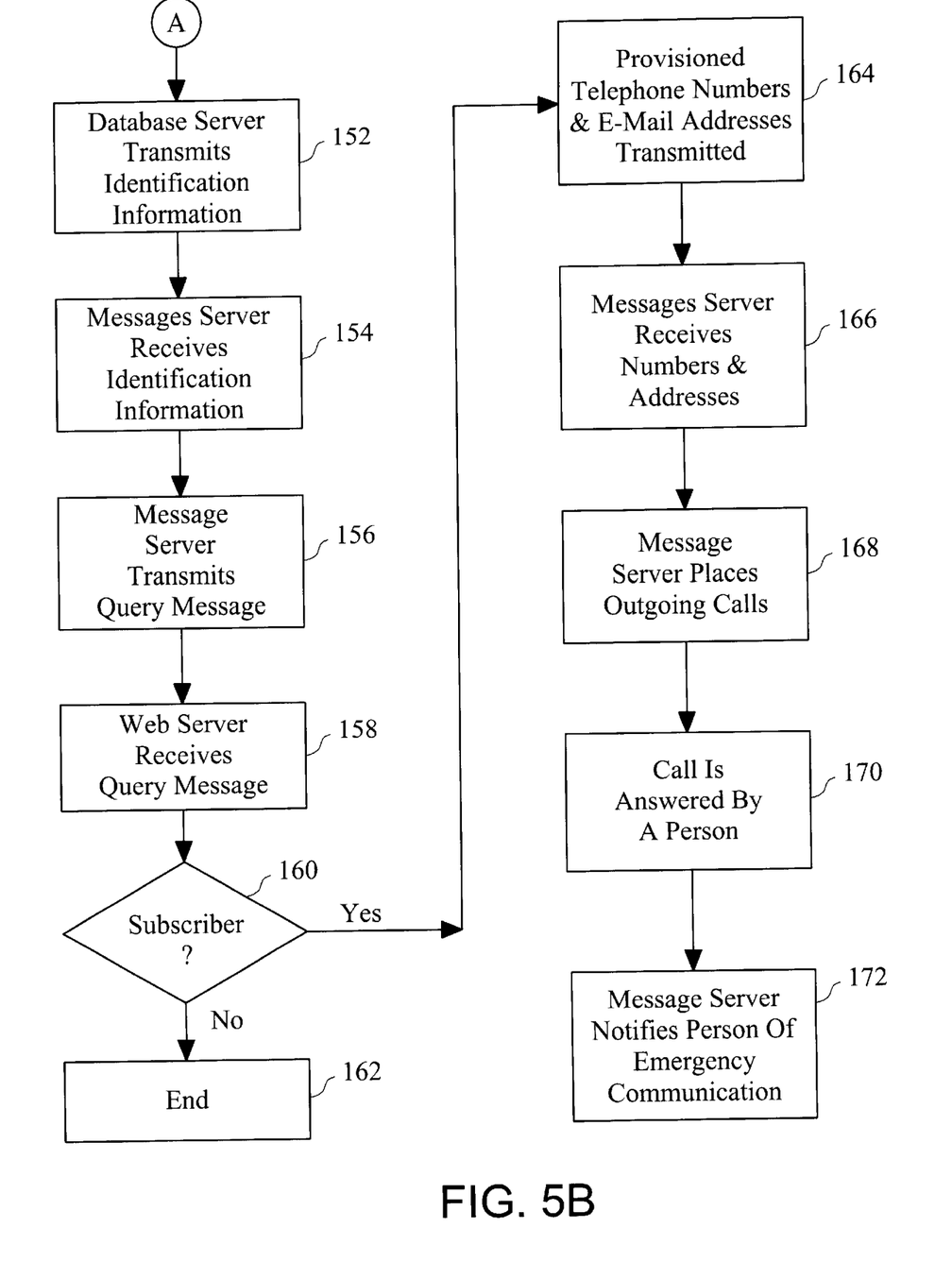
Figure 5C:
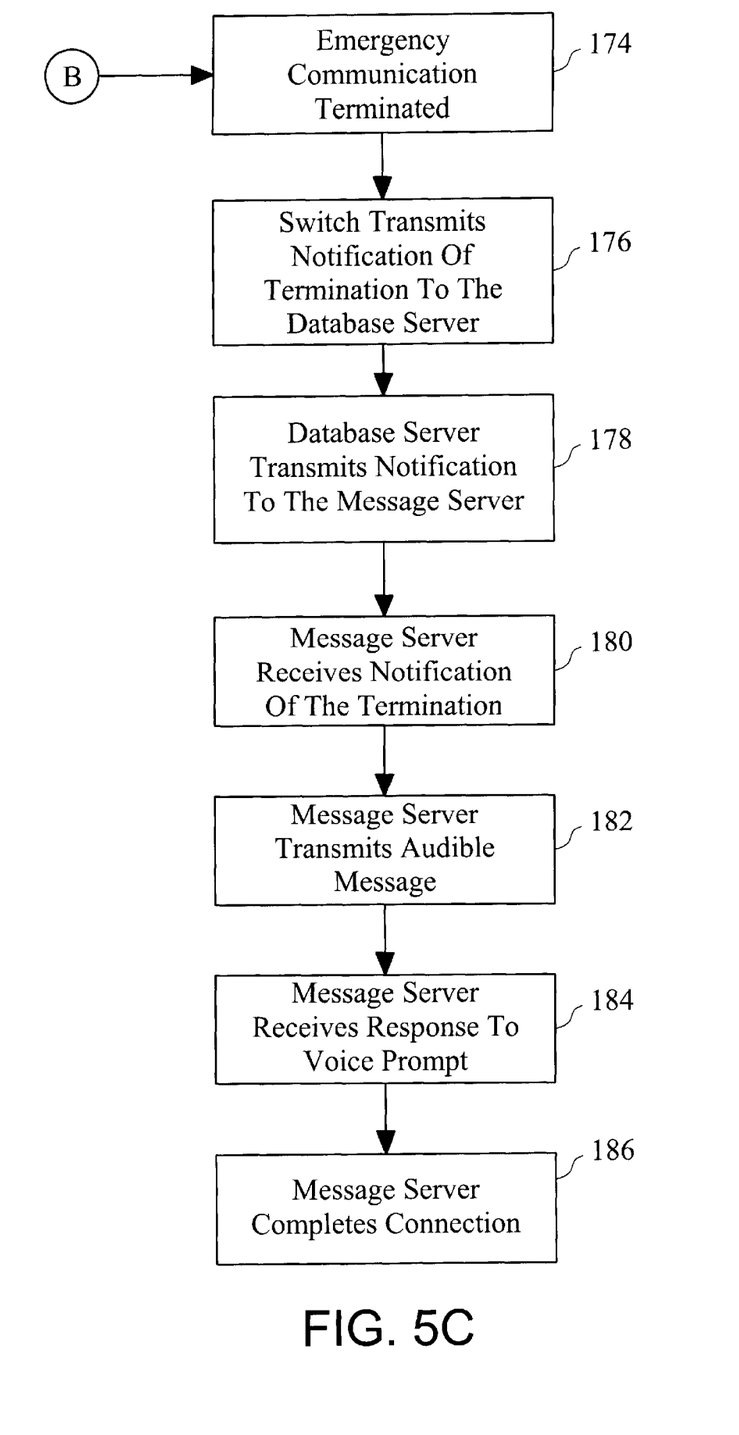

FIGS. 5A, 5B, and 5C illustrate an embodiment of a process flow of the emergency notification system 110 of FIG. 4. After the subscriber information has been provisioned at the web server 118 via the Internet 46, the emergency notification service becomes operational for the subscriber. The process begins at block 130, where an emergency communication is originated from customer premises equipment and transmitted to the switch 112 via the subscriber line 24 connecting the customer premises equipment to the switch 112. The customer premises equipment may be, for example, a landline telephone 26 connected to a subscriber line 24. From block 130, the process proceeds to block 132, where the emergency communication is received at the switch 112. From block 132, the process proceeds to block 134, where the received emergency communication activates a trigger defined at the switch 112. The trigger may be an originating trigger such as, for example, an N11 trigger, and the N11 trigger may be, for example, a 911 trigger. From block 134, the process proceeds to block 136, where in response to the activation of the trigger, the switch 112 generates a query message. The query message may include a caller ID message giving the customer's telephone number, and the date and time that the emergency communication was made. The caller ID message may also include the name of the customer. From block 136, the process proceeds to block 138, where the switch 112 transmits the query message to the STP 20. From block 138, the process proceeds to block 140, where the STP 20 receives the query message and transmits the query message to the database server 114. From block 140, the process proceeds to block 142, where the database server 114 receives the query message generated by the switch 112.

From block 142, the process proceeds to block 144, where the database server 114 generates a message in response to the query message and transmits the response message to the STP 20. The response message may instruct the switch 112 to process the emergency communication as a switch-based feature and to notify the database server 114 when the emergency communication is terminated. From block 144, the process proceeds to block 146, where the STP 20 receives the response message and transmits it to the switch 112. From block 146, the process proceeds to block 148, where the switch 112 receives the response message. From block 148, the process proceeds to block 150, where the switch 112 interprets the response message and routes the emergency communication to a Public Safety Answering Point (PSAP), where a PSAP operator verifies or obtains the caller's location, determines the nature of the emergency, and decides the appropriate emergency response.

While the process is proceeding from block 142 to block 144, the process also proceeds from block 142 to block 152, where the database server 114 transmits identification information provided by the query message to the message server 116 via communication link 120. As described hereinabove, such information may include a caller ID message giving the customer's telephone number, and the date and time that the emergency communication was made. The caller ID message may also include the name of the customer. From block 152, the process proceeds to block 154, where the message server 116 receives the transmitted information. From block 154, the process proceeds to block 156, where, in response to the information received from the database server 114, the message server 116 transmits a query message to the web server 118 via communication link 122. From block 156, the process proceeds to block 158, where the web server 118 receives the query message. From block 158, the process proceeds to block 160, where the web server 118 determines whether the customer is a subscriber to the emergency notification service. If the customer has not been provisioned as a subscriber to the emergency notification service, the process proceeds from block 160 to block 162, where the process ends.

If the customer has been provisioned as a subscriber to the service, the process proceeds from block 160 to block 164, where the web server 118 transmits the associated provisioned telephone numbers and electronic mail addresses to the message server 116 via communication link 122. From block 164, the process proceeds to block 166, where the message server 116 receives the provisioned telephone numbers and electronic mail addresses. From block 166, the process proceeds to block 168, where the message server 116 begins to place outgoing notification calls to the designated telephone numbers in a sequential manner. From block 168, the process proceeds to block 170, where a person answers a notification call at one of the designated telephone numbers. From block 170, the process proceeds to block 172, where the message server 116 notifies that person of the emergency communication by announcing that the incoming call is from the emergency notification service, that an emergency communication was placed, the telephone number from which the emergency communication was placed, and the time that the emergency communication was placed. Once the announcement has been played to a person who answers at a designated telephone number, the message server 116 may stop placing outgoing notification calls to that particular telephone number. The message server 116 may, however, continue to dial the remaining designated telephone numbers until the announcement has been played to a person who answers the call at those telephone numbers.

While the processes described with respect to blocks 168, 170, and 172 are active, the process may also proceed from block 150 to block 174, where the emergency communication originated at block 130 is terminated. From block 174, the process proceeds to block 176, where the switch 112 recognizes that the emergency communication has been terminated and transmits notification of the termination to the database server 114 via the STP 20. By sensing and recognizing a change in a DC signal associated with the subscriber line 24 that carried the emergency communication, the switch 112 may recognize the termination of the emergency communication. From block 176, the process proceeds to block 178, where the database server 114 receives the notification from the switch 112 and transmits notification of the termination to the message server 116.

From block 178, the process proceeds to block 180, where the message server 116 receives notification that the emergency communication has been terminated. From block 180, the process proceeds to block 182, where the message server 116 transmits an audible message to a communication device associated with a notified party. The message may include a voice prompt for prompting the notified party to connect to the customer premises equipment from which the emergency communication originated. From block 182, the process proceeds to block 184, where the message server 116 receives a response to the voice prompt. According to one embodiment, the response may be in the form of a dual tone multi-frequency signal generated by the notified party pressing a pushbutton on a communication device. According to another embodiment, the response may be in the form of a signal representative of a spoken word or number. From block 184, the process proceeds to block 186, where the message server 116 interprets the response and completes a connection between the customer premises equipment from which the emergency communication originated and the customer premises equipment associated with the notified party. Once the connection is completed, the notified party may speak directly to the person who placed the emergency communication.

Figure 6:
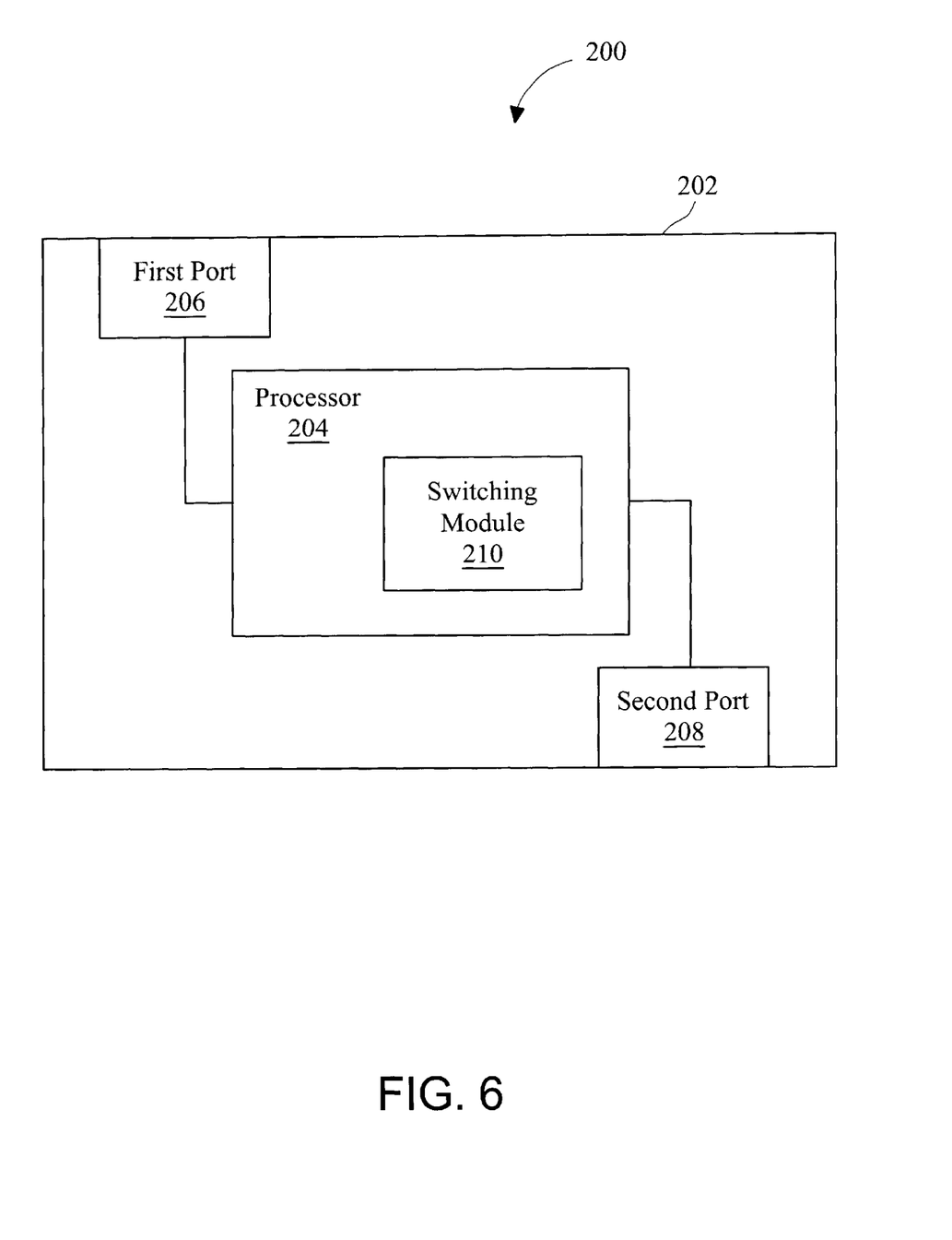
FIG. 6 illustrates an apparatus according to one embodiment of the present invention.

FIG. 6 illustrates an apparatus 200 according to one embodiment of the present invention. The apparatus 200 may include a housing 202 that encloses the electronic circuitry and certain other components of the apparatus 200, a processor 204, and first and second ports 206, 208. According to one embodiment, the apparatus 200 may be similar to the SN 22 or the message server 166 described hereinabove.

The processor 204 is located within the housing 202 and may be a central processing unit (CPU) including, e.g., a microprocessor, an application specific integrated circuit (ASIC), or one or more printed circuit boards. The processor 204 may be for generating a message that includes a voice prompt. Such a message may, for example, announce that an emergency communication has been placed from a particular landline telephone 26, or may, for example, audibly instruct a notified party how to connect to a landline telephone 26 from which an emergency communication has been placed. The processor 204 may also be for interpreting a response to a voice prompt, and for placing an outgoing call. According to one embodiment, the outgoing call may be placed to a communication device associated with a designated telephone number. According to another embodiment, the outgoing call may be placed to a landline telephone 26 from which an emergency communication has been placed.

The processor 204 may include a switching module 210 for completing a connection between first and second communication devices. According to one embodiment, the first communication device may be a landline telephone 26 from which an emergency communication has been originated, and the second communication device may be a landline telephone 26 or wireless telephone associated with a notified party. The switching module 210 may be implemented as microcode configured into the logic of the processor 204, or may be implemented as programmable microcode stored in an electrically erasable programmable read only memory (EEPROM). According to another embodiment, the switching module 210 may be implemented as software code to be executed by the processor 204. The software code may be written in any suitable programming language using any suitable programming technique. For example, the software code may be written in C using procedural programming techniques, or in Java or C++ using object oriented programming techniques. The software code may be stored as a series of instructions or commands on a computer readable medium, such as a random access memory (RAM) or a read only memory (ROM), a magnetic medium such as a hard-drive or a floppy disk, or an optical medium such as a CD-ROM.

The first port 206 may be in communication with the processor 204, and may be for receiving information. Such information may include, for example, notification that an emergency communication has been terminated. The second port 208 may be in communication with the processor 204, and may be for transmitting information. Such information may include, for example, a message instructing a notified party how to connect to a landline telephone 26 from which an emergency communication has been placed. The second port 208 may also be for receiving information. Such information may include, for example, a response to a voice prompt.

Although the present invention has been described and illustrated in detail herein with respect to certain embodiments, it is clearly understood that the same is by way of example and is not to be taken by way of limitation. It will be appreciated by those of ordinary skill in the art that numerous modifications and variations of the present invention may be implemented without departing from the spirit and scope of the present invention as described in the appended claims.

What is claimed is:

1. A method for establishing a connection between a first communication device and a second communication device, the first communication device having transmitted an emergency communication and the second communication device having received notification that the emergency communication was transmitted, the connection being established following termination of the emergency communication, the method comprising:

receiving notification that the emergency communication was terminated;

transmitting a message to the second communication device, wherein the message includes a voice prompt for connecting to the first communication device;

receiving a response to the voice prompt; and completing the connection between the first and second communication devices.

2. The method of claim 1, wherein receiving notification includes:

recognizing that the emergency communication has been terminated; and transmitting a notification that the emergency communication has been terminated.

3. The method of claim 2, wherein recognizing that the emergency communication has been terminated includes sensing a DC signal associated with a subscriber line connected to the first communication device.

4. The method of claim 1, wherein receiving a response includes receiving a dual tone multi-frequency signal.

5. The method of claim 1, wherein receiving a response includes receiving a signal representative of an voice response.

6. The method of claim 1, wherein completing the connection includes:

interpreting the response to the voice prompt; and placing a call to the first communication device.

7. An apparatus for establishing a connection between a first communication device and a second communication device, the first communication device having transmitted an emergency communication and the second communication device having received notification that the emergency communication was transmitted, the connection being established following termination of the emergency communication, the apparatus comprising:

means for receiving notification that the emergency communication was terminated;

means for transmitting a message to the second communication device, wherein the message includes a voice prompt for connecting to the first communication device;

means for receiving a response to the voice prompt; and means for completing the connection between the first and second communication devices.

8. The apparatus of claim 7, wherein the means for receiving notification includes:

means for recognizing that the emergency communication has been terminated; and means for transmitting a notification that the emergency communication has been terminated.

9. The apparatus of claim 8, wherein the means for recognizing that the emergency communication has been terminated includes means for sensing a DC signal associated with a subscriber line connected to the first communication device.

10. The apparatus of claim 7, wherein the means for receiving a response includes means for receiving a dual tone multi-frequency signal.

11. The apparatus of claim 7, wherein the means for receiving a response includes means for receiving a signal representative of an oral response.

12. The apparatus of claim 7, wherein the means for completing the connection includes:

means for interpreting the response to the voice prompt; and means for placing a call to the first communication device.

13. A computer readable medium having stored thereon a set of instructions which, when executed by a processor, cause the processor to perform the steps of:

receiving notification that the emergency communication was terminated;

transmitting a message to the second communication device, wherein the message includes a voice prompt for connecting to the first communication device;

receiving a response to the voice prompt; and completing the connection between the first and second communication devices.

14. The computer-readable medium of claim 13, wherein the medium comprises at least one of a RAM, a ROM, a disk, an ASIC, and a PROM.

15. An apparatus for establishing a connection between a first communication device and a second communication device, the first communication device having transmitted an emergency communication and the second communication device having received notification that the emergency communication was transmitted, the connection being established following termination of the emergency communication, the apparatus comprising:

a housing;

a processor within the housing, wherein the processor includes a switching module for completing the connection between the first and second communication devices, and wherein the processor is for generating a message, that includes a voice prompt;

a first port in communication with the processor, wherein the first port is for receiving notification that the emergency communication was terminated; and a second port in communication with the processor, wherein the second port is for transmitting the message to the second communication device.

16. The apparatus of claim 15, wherein the processor is for interpreting a response to the voice prompt.

17. The apparatus of claim 15, wherein the processor is for placing an outgoing call.

18. The apparatus of claim 15, wherein the processor is for placing an outgoing call to the first communication device.

19. The apparatus of claim 15, wherein the communication device processor is for placing an outgoing call to the second communication device.

20. A system for establishing a connection between a first communication device and a second communication device, the first communication device having transmitted an emergency communication and the second communication device having received notification that the emergency communication was transmitted, the connection being established following termination of the emergency communication, the system comprising:

a server for supplying information associated with a subscriber; and an apparatus in communication with the server, wherein the apparatus includes:

a housing;

a processor within the housing, wherein the processor includes a switching module for completing the connection between the first and second communication devices, and wherein the processor is for generating a message that includes a voice prompt;

a first port in communication with the processor, wherein the first port is for receiving notification that the emergency communication was terminated; and a second port in communication with the processor, wherein the second port is for transmitting the message to the second communication device.

* * * * *